(12) United States Patent
Ongyanco et al.

(10) Patent No.: US 11,942,870 B2
(45) Date of Patent: *Mar. 26, 2024

(54) POWER SUPPLY UNIT WITH AUTONOMOUS INPUT POWER LIMITING

(71) Applicant: Astec International Limited, Kowloon (HK)

(72) Inventors: Donald Cedrick Ongyanco, Quezon (PH); Joey De Guzman, Antipolo (PH); Vincent Vicente Vivar, Calumpit (PH); Ricardo Bernado Roldan, Jr., Mandaluyong (PH); Arvin San Juan, Carmona (PH)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,832

(22) Filed: Feb. 28, 2023

(65) Prior Publication Data
US 2023/0283192 A1 Sep. 7, 2023

Related U.S. Application Data

(63) Continuation of application No. 17/144,507, filed on Jan. 8, 2021, now Pat. No. 11,601,063.

(51) Int. Cl.
| H02M 7/04 | (2006.01) |
| H02M 1/32 | (2007.01) |
| H02M 3/04 | (2006.01) |

(52) U.S. Cl.
CPC ............... *H02M 7/04* (2013.01); *H02M 1/32* (2013.01); *H02M 3/04* (2013.01)

(58) Field of Classification Search
CPC ............. H02M 1/0003; H02M 1/0016; H02M 1/0022; H02M 1/0025; H02M 1/32; H02M 3/04; H02M 7/04; H02M 7/155
See application file for complete search history.

(56) References Cited

U.S. PATENT DOCUMENTS 11,601,063 B2 * 3/2023 Ongyanco ............... H02M 7/04
2017/0126026 A1 * 5/2017 Gerna ....................... H02J 7/00

* cited by examiner

*Primary Examiner* — Gary L Laxton (57) ABSTRACT

A power supply receives AC power and generates a DC output voltage. The power supply may be divided into a primary section that converts AC power to a relatively high DC voltage. A secondary section converts this relatively high DC voltage into a well-regulated lower DC voltage. In an embodiment, the current and/or power supplied by the primary to the secondary side is used by the secondary side in a closed-loop feedback system to limit the current drawn by the secondary side to a configurable value.

19 Claims, 7 Drawing Sheets

POWER SUPPLY UNIT WITH AUTONOMOUS INPUT POWER LIMITING

CROSS-REFERENCE TO RELATED APPLICATIONS

This application claims the benefit of and priority to U.S. application Ser. No. 17/144,507 filed Jan. 8, 2021, and issued as U.S. Pat. No. 11,601,063, the entire disclosure of which is incorporated herein by reference.

TECHNICAL FIELD

Aspects of the disclosure are related to the field of power supply units, and in particular, to optimizing system level input power management by providing a power supply unit with highly accurate and autonomous input power limiting capabilities.

BACKGROUND

This section provides background information related to the present disclosure which is not necessarily prior art.

A power supply unit is an electrical device that supplies electric power to an electrical load. Indeed, power supply units typically have a power input connection, which receives energy in the form of electric current from a source, and one or more power output connections that deliver current to the load. The primary function of a power supply is to convert electric current from a source to a correct voltage, current, and frequency to power a load. Indeed, a power supply unit may perform a variety of functions, such as, but not limited to, power conversion, alternating current to direct current (AC-DC) or DC-DC conversion, adjusting voltage levels, and providing backup power during power grid outages.

A power supply system typically includes multiple power sources (or power supply units) that provide power and an external system (or controller) that provides power management functionality including input current limiting for the multiple power sources. Power limiting is the practice in electrical or electronic circuits of imposing an upper limit on the power (e.g., current) that may be delivered to a load with the general purpose of protecting the circuit generating or transmitting the current from harmful effects due to a short-circuit or similar problem in the load. In the context of data centers, input power limiting is typically utilized to control power distribution and provide load sharing amongst the multiple power sources. For example, an external system (or external controller) typically handles power management by relying on an alert signal asserted by a power supply unit to determine when a load is reaching an over current warning level. Indeed, when a power supply unit reaches a threshold current (e.g., over current warning level), the power supply unit asserts the alert signal to appropriately inform the external system (or controller). The external system (or controller) responsively reduces the processing utilization associated with the power supply unit to lower the load which, in turn, reduces the input the input power (e.g., current) drawn by the power supply unit.

Unfortunately, conventional power supply systems suffer numerous deficiencies with respect to input power limiting. For example, response times for adjusting the input power are often slow and inaccurate because adjustments to the input power must be made by the external system (or controller). Furthermore, the external system (or controller) must utilize extensive processing resources to compute equivalent output power limiting for the power supply units. That is, the external system (or controller) must determine how to modify the load associated with each power supply unit by adjusting the corresponding processing utilization.

SUMMARY

One or more embodiments described herein, among other benefits, solve one or more of the foregoing or other problems in the art by providing systems, methods, and non-transitory computer readable media for limiting input current and/or power drawn by a power supply unit. In some implementations, the technology described includes a method comprising: generating an output current adjustment based on an input power and an input power limit; and, regulating an output voltage based on an output current and the output current adjustment.

In some implementations, the technology described includes a method of regulating a secondary side output current, comprising: regulating an output voltage using closed-loop current feedback; generating an error adjustment signal based on a primary side input power and a target power limit; and, using the error adjustment signal to limit an output current of the output voltage.

In some implementations, the technology described includes a power supply system, comprising: a secondary output voltage regulator that uses a closed-loop current feedback signal to produce an output voltage; an error adjustment signal that is based on a primary side input power and a target input power limit; and, a current feedback combiner to, based on the error adjustment signal, change the closed-loop reference signal to limit an output current.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not considered to be limiting of its scope. Implementations will be described and explained with additional specificity and detail through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Example implementations are provided so that this disclosure will be thorough, and will fully convey the scope to persons skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In an embodiment, a power supply receives AC power and generates a DC output voltage. The power supply may be divided into a primary section that converts AC power to a relatively high DC voltage. A secondary section converts this relatively high DC voltage into a well regulated lower DC voltage. In an embodiment, the current and/or power supplied by the primary to the secondary side is used by the secondary side in a closed-loop feedback system to limit the current drawn by the secondary side to a configurable value.

Figure 1:
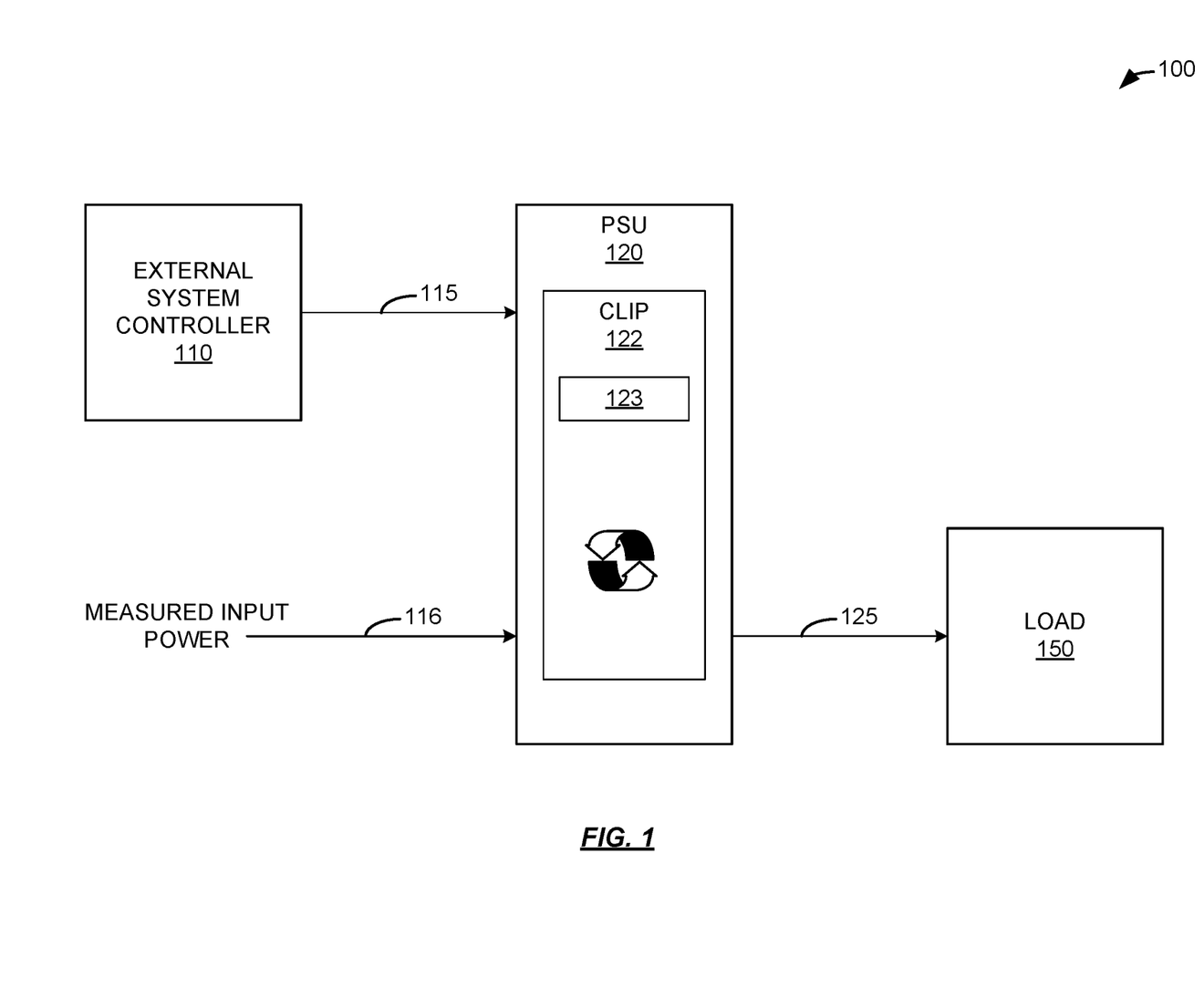
FIG. 1 is a block diagram illustrating a power supply system.

FIG. 1 is a block diagram illustrating a power supply system. In FIG. 1, system 100 comprises external system controller 110, power supply unit 120, and load 150. Power supply unit 120 includes closed-loop input power (CLIP) circuitry 122. CLIP 122 includes power limit storage 123. External system controller 110 is operatively coupled to PSU 120. External system controller 110 is operatively coupled to PSU 120 to provide PSU 120 with at least a input power limit 115 that is stored by power limit storage 123. PSU 120 is operatively coupled to load 150. PSU 120 is operatively coupled to load 150 to provide load 150 with a variable amount of output current 125 at a regulated DC voltage. PSU 120 also receives a varying indicator of measured input power 116.

It should be understood that for the purposes of this disclosure, because power supplies are supplied with a constant input voltage, but draw a varying amounts of input current depending upon load, input current and input power can be used interchangeably to refer to input power and/or input current. For the same reasons, input current limit and input power limit can be used interchangeably to refer to input power limits and/or input current limits. Likewise, because power supplies provide loads with a constant output voltage, but supply a varying amount of output current to that load, output current and output power can be used interchangeably to refer to output power and/or output current. input current limit and input power limit can be used interchangeably to refer to input power limits and/or input current limits.

In an embodiment, the amount of output current 125 supplied to load 150 affects the amount of input current drawn by PSU 120. Because the input current drawn by PSU 120 is indicated by measured input power 116, CLIP can rely on a feedback loop to limit the input power to PSU 120. This feedback loop includes a comparison of measured input power 116 to the input power limit 115 that is stored by power limit storage 123, and the output current 125. In other words, based on the input power limit 115 stored by power limit storage 123 and the measured input power 116, CLIP adjusts the amount of current supplied to load 150. This in-turn affects the measured input power completing the feedback loop. CLIP adjusts the amount of current supplied to load 150 to limit the measured input power 116 to at or below the amount of current indicated by power limit storage 123.

Figure 2:
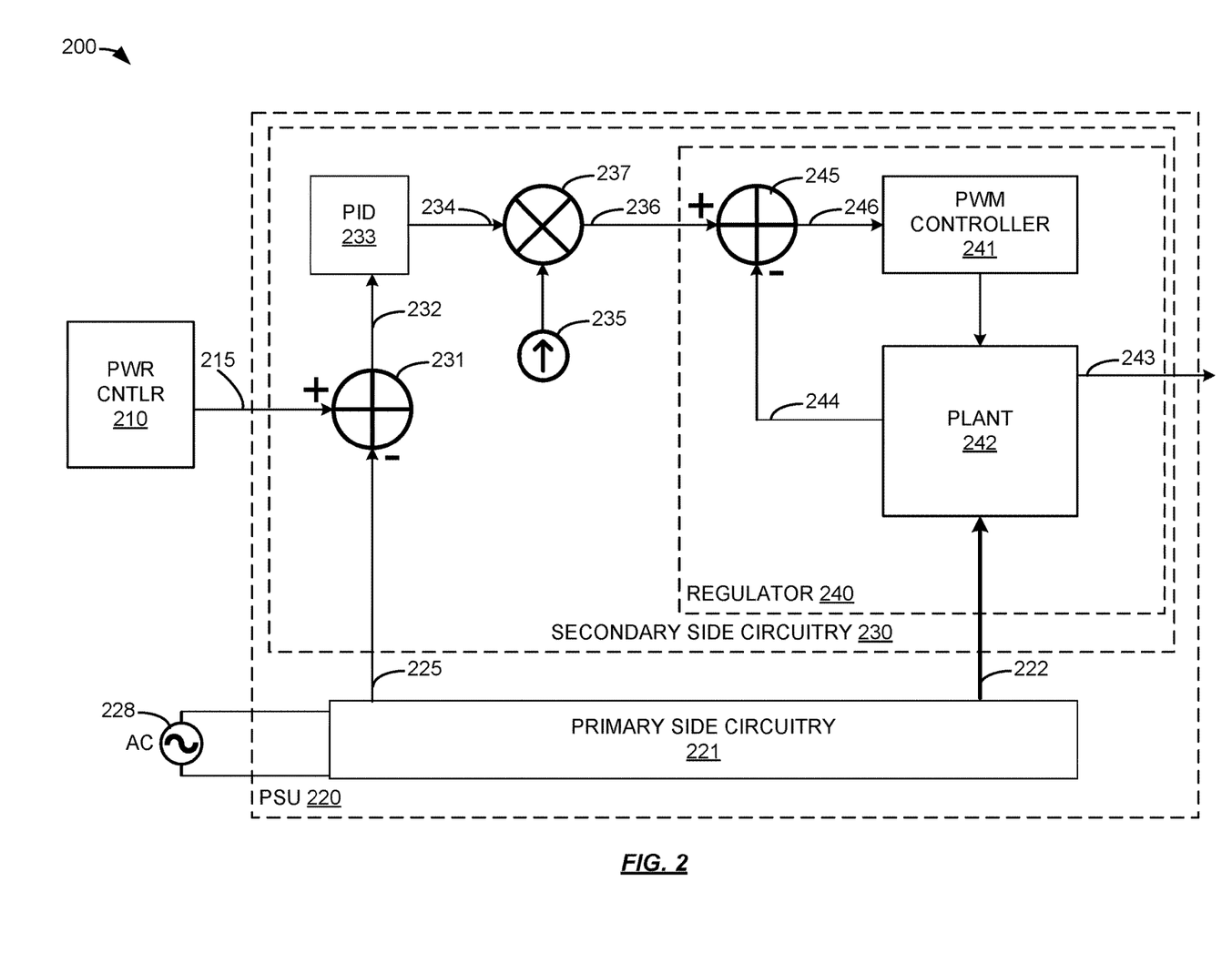
FIG. 2 is a block diagram illustrating a closed-loop input current/power limited power supply system.

FIG. 2 is a block diagram illustrating a closed-loop input current/power limited power supply system. In FIG. 2, system 200 comprises power controller 210, power supply unit 220, and AC power source 228. Power supply unit 220 includes primary side circuitry 221 and secondary side circuitry 230. Secondary side circuitry 230 includes compare (subtract) 231, error indicator 232, proportional-integral-derivative (PID) 233, adjustment indicator 234, reference current 235, scaled current reference indicator 236, scaler 237, and regulator 240. Regulator 240 includes compare (subtract) 245, error indicator 246, pulse-width modulation (PWM) controller 241, plant 242, regulated output 243, and output current indicator 244.

AC power source 228 supplies varying power (varying current at a fixed voltage) to primary side circuitry 221 according to the needs of PSU 220. Primary side circuitry 221 supplies varying current 222 (again, varying current at a fixed voltage) to plant 242. Primary side circuitry 221 also provides a varying input current indicator 225 to compare 231. Varying input current indicator 225 conveys information about the amount of current being supplied by power source 228 to primary side circuitry 221.

Compare 231 also receives input current limit 215. Compare 231 subtracts input current indicator 225 from current limit indicator 215 to generate error indicator 232. Thus, error indicator 232 is a measure of how close input current indicator 225 is to meeting or exceeding current limit indicator 215. PID 233 receives error indicator 232 and outputs adjustment indicator 234.

Adjustment indicator 234 may be viewed as a percentage of full current capacity that regulator 240 is allowed to supply. Adjustment indicator 234 may vary between indications of from 0% to 100% (as with many feedback control systems.) Adjustment indicator 234 indicates 100% as long as error indicator 232 is positive (i.e., input current indicator 225 is less than input current limit 215.) When error indicator 232 is negative (i.e., input current indicator 225 is greater than input current limit 215) PID 233 fractionally reduces adjustment indicator 234 to decrease the amount of current output by regulator 240.

Scaler 237 effectively multiplies reference current 235 by adjustment indicator 234 and outputs scaled current reference indicator 236. Thus, scaled current reference indicator 236 effectively sets the maximum current to be output by regulator 240 as a percentage of reference current 235. In other words, when adjustment indicator 234 is indicating 100%, the maximum current allowed to be output by regulator 240 is reference current 235. When adjustment indicator 234 is indicating 50%, the maximum current allowed to be output by regulator 240 is 50% of reference current 235, and so on.

Regulator 240 receives scaled current reference indicator 236. Compare 245 receives scaled current reference indicator 236 and an output current indicator 244 provided by plant 242. Compare 245 subtracts output current indicator 244 from scaled current reference indicator 236 to generate error indicator 246. Thus, error indicator 246 is a measure of how close output current indicator 244 is to meeting or scaled current reference indicator 236. PWM controller 241 receives error indicator 246 and controls plant 242 to provide a limited current on regulated output 243 according to error indicator 246.

Thus, it should be understood that compare 245, PWM controller 241, and plant 242 are parts of a secondary side feedback loop that limits the current output by regulated output 243 to a target value. It should also be understood that because plant 242 of regulator 240 receives current 222 from primary side circuitry 221, regulator 240, primary side circuitry 221, compare 231, PID 233, and scaler 237 are part of a primary side feedback loop that limits input current from power source 228.

Figure 3:
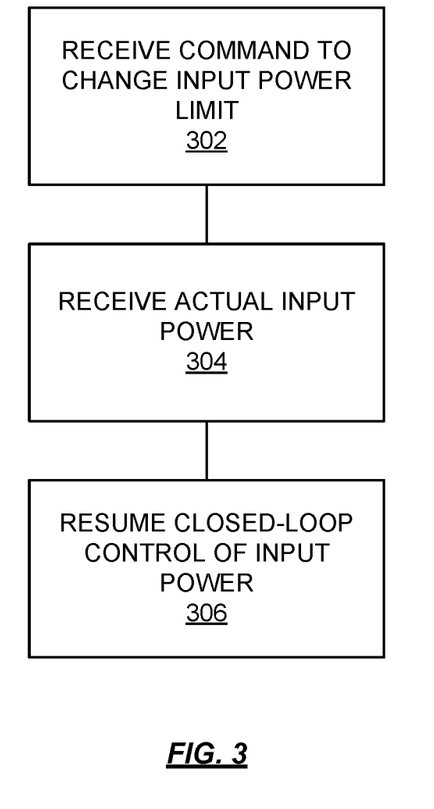
FIG. 3 is a flowchart illustrating a method of changing a power supply power limit.

FIG. 3 is a flowchart illustrating a method of changing a power supply power limit. One or more steps illustrated in FIG. 3 may be performed by, for example, system 100, system 200, and/or their components. A command is received to change an input power limit (302). For example, PSU 120 may receive a command from external system controller 110 to change the input power limit 115 stored in power limit storage 123.

The actual input power is read (304). For example, CLIP 122 may receive measured input power 116. Closed-loop control of the input power is resumed (306). For example, CLIP 122 may resume closed-loop control using the new input power limit 115 stored in power limit storage 123 and the measured input power 116.

Figure 4:
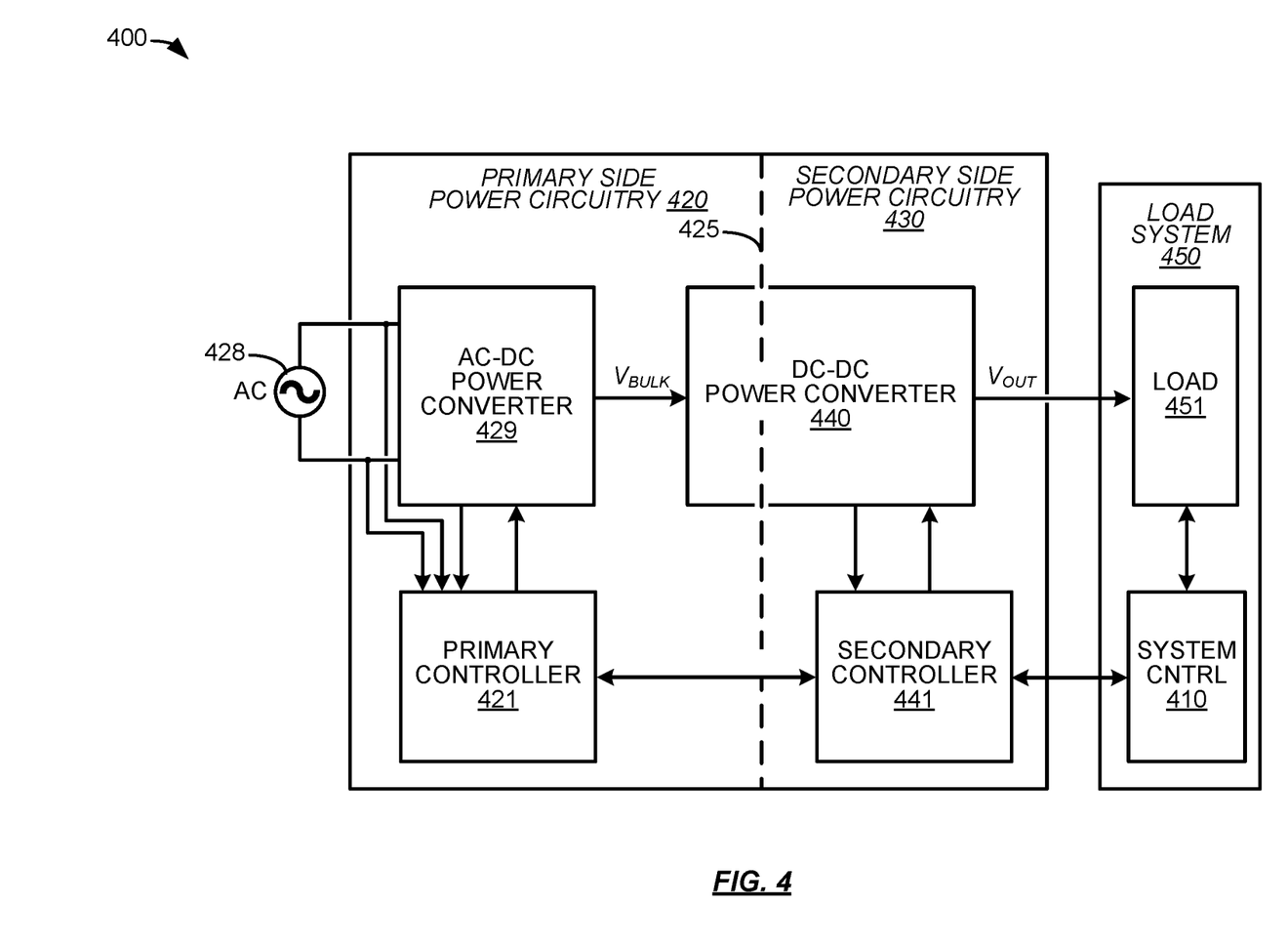
FIG. 4 is a block diagram illustrating a system.

FIG. 4 is a block diagram illustrating a system. coupled to a power supply. In FIG. 4, system 400 includes AC power source 428, primary side circuitry 420, secondary side circuitry 430, and load system 450. Load system 450 include load 451 and system control 410. Primary side circuitry 420 include primary controller 421, AC-DC power converter 429, and portion of DC-DC power converter 440. Secondary side circuitry 430 includes the remaining portion of DC-DC power converter 440, and secondary controller 441. Primary side circuitry 420 and secondary side circuitry 430 are separated by isolation 425.

It should be understood that primary side circuitry 420 may be, include, or implement all or parts of primary side circuitry 221. Secondary side circuitry 430 may be, include, or implement all or parts of secondary side circuitry 230. Together, primary side circuitry 420 and secondary side circuitry 430 may be, include, or implement all or parts of CLIP 122, PSU 120, and/or PSU 220.

AC-DC power converter 429 receives AC power from AC power source 428. AC-DC power converter 429 converts AC power from AC power source 428 to DC supply voltage $V_{bulk}$. $V_{bulk}$ is provided to DC-DC power converter 440. AC-DC power converter 429 is controlled by primary controller 421. Primary controller 421 receives information about AC power source 428 (e.g., input current indicator).

Primary controller 421 is operatively coupled to secondary controller 441 and system controller 410. Primary controller 421 is operatively coupled to system controller 410 to transmit or receive commands and/or other information (e.g., input current limit indicator) used to control AC-DC power converter 429.

DC-DC power converter 440 receives DC supply voltage $V_{bulk}$. DC-DC power converter 440 converts DC power from DC supply voltage $V_{bulk}$ to DC supply voltage $V_{out}$. $V_{out}$ is provided to load system 450 and load 451, in particular.

Secondary controller 441 is operatively coupled to primary controller 421 and system controller 410. Secondary controller 441 is operatively coupled to system controller 410 to transmit or receive commands and/or other information (e.g., output current limit indicator) used to control DC-DC power converter 440. Secondary controller 441 is operatively coupled to primary controller 421 to transmit or receive commands and/or other information (e.g., input current indicator) used to control DC-DC power converter 440.

Figure 5:
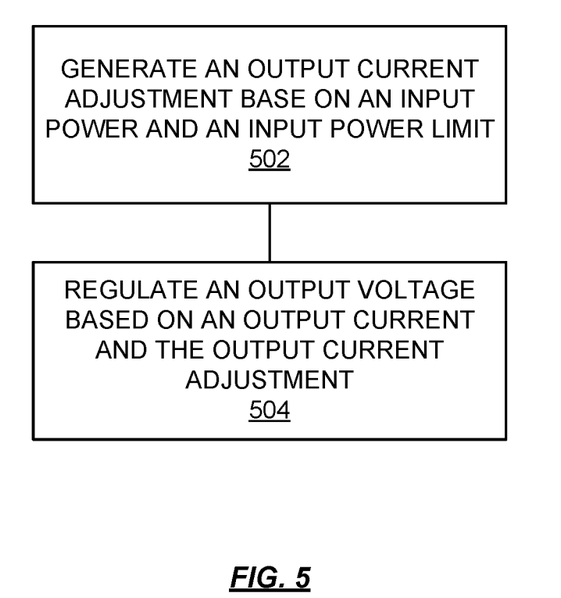
FIG. 5 is a flowchart illustrating a method of operating a power supply.

FIG. 5 is a flowchart illustrating a method of changing a power supply power limit. One or more steps illustrated in FIG. 5 may be performed by, for example, system 100, system 200, system 400, and/or their components. An output current adjustment is generated based on an input power and an input power limit (502). For example, scaled current reference indicator 236 may be generated by compare 231, PID 233, and scaler 237 based on input current limit 215 and input current indicator 225.

An output voltage is regulated based on an output current and the output current adjustment (504). For example, regulator 240 may regulate output 243 based on scaled current reference indicator 236 and output current indicator 244.

Figure 6:
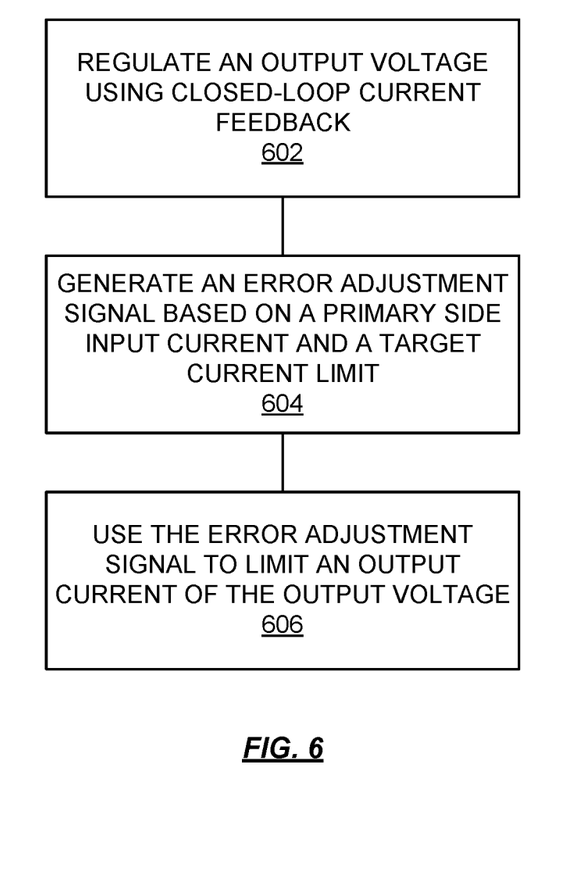
FIG. 6 is a flowchart illustrating a method of regulating a secondary side output current.

FIG. 6 is a flowchart illustrating a method of changing a power supply power limit. One or more steps illustrated in FIG. 6 may be performed by, for example, system 100, system 200, system 400, and/or their components. An output voltage is regulated using a closed-loop current feedback (602). For example, regulator 240 may regulate output 243 based on a closed feedback loop that includes output current indicator 244.

An error adjustment signal is generated based on a primary side input current and a target current limit (604). For example, scaled current reference indicator 236 may be generated by compare 231, PID 233, and scaler 237 based on input current limit 215 and input current indicator 225. The error adjustment signal is used to limit an output current of the output voltage (606). For example, regulator 240 may, based on scaled current reference indicator 236, limit the current provided by output 243.

Figure 7:
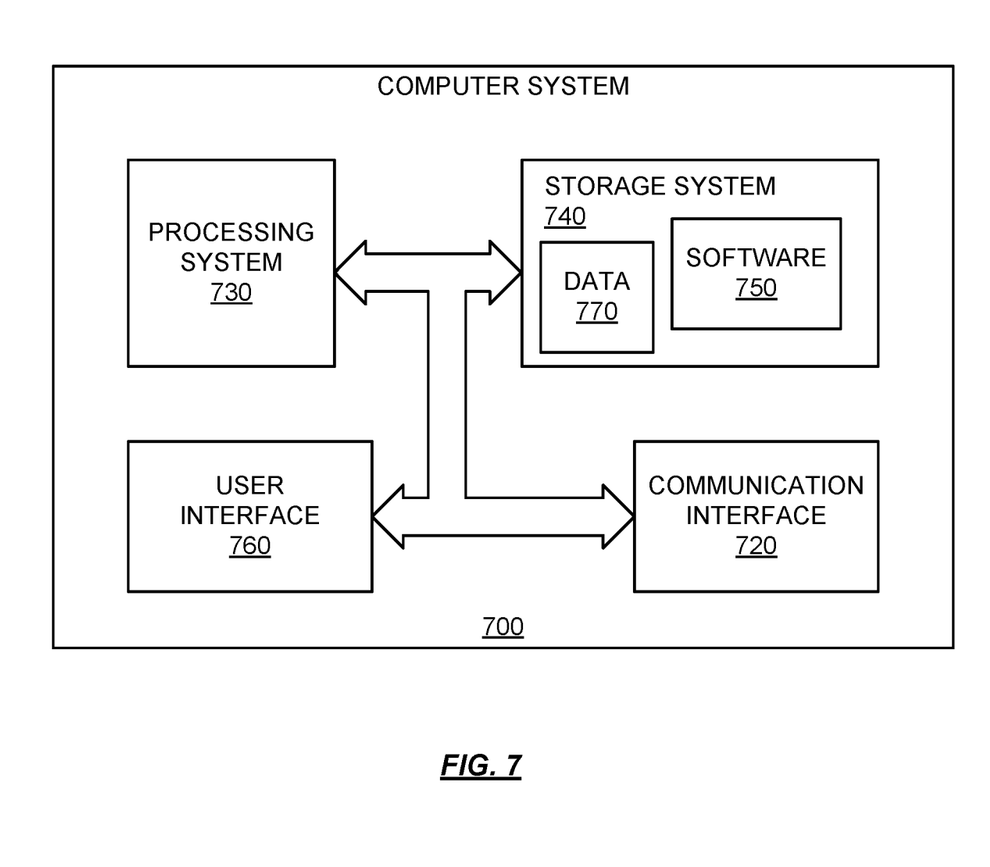
FIG. 7 is a block diagram illustrating a computer system.

FIG. 7 is a block diagram illustrating a computer system. In an embodiment, computer system 700 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, system 400, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 7 illustrates a block diagram of an example computer system. Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, EEPROM, flash memory, network storage, server, or other memory function. Storage system 740 may include computer readable medium. Storage system 740 may be distributed among multiple memory devices.

Processing system 730 retrieves and executes software 750 from storage system 740. Processing system 730 may retrieve and store data 770. Processing system 730 may also retrieve and store data via communication interface 720. Processing system 750 may create or modify software 750 or data 770 to achieve a tangible result. Processing system may control communication interface 720 or user interface 760 to achieve a tangible result. Processing system 730 may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

Implementations discussed herein include, but are not limited to, the following examples:

Example 1: A method, comprising: generating an output current adjustment based on an input power and an input power limit; and, regulating an output voltage based on an output current and the output current adjustment.

Example 2: The method of claim 1, wherein the output current adjustment is further based on a constant current reference.

Example 3: The method of claim 2, wherein the output current adjustment is based on a difference between the input power and the input power limit.

Example 4: The method of claim 3, wherein the output current adjustment decreases the output current when the input power exceeds the input power limit.

Example 5: The method of claim 4, wherein the output current adjustment does not affect the output current when the input power is less than the input power limit.

Example 6: The method of claim 5, wherein the input power limit is configurable.

Example 7: The method of claim 6, wherein the input power is received from a primary side power supply.

Example 8: A method of regulating a secondary side output current, comprising: regulating an output voltage using closed-loop current feedback; generating an error adjustment signal based on a primary side input current and a target current limit; and, using the error adjustment signal to limit an output current of the output voltage.

Example 9: The method of claim 8, wherein the error adjustment signal is further based on a constant current reference.

Example 10: The method of claim 9, wherein the error adjustment signal is based on a difference between the primary side input power and the target current limit.

Example 11: The method of claim 10, wherein the error adjustment signal causes the closed-loop current feedback to decrease the output current when the primary side input power exceeds the target current limit.

Example 12: The method of claim 11, wherein the error adjustment signal does not affect the output current when the primary side input power is less than the target current limit.

Example 13: The method of claim 12, wherein the target current limit is configurable.

Example 14: The method of claim 13, wherein the closed-loop current feedback includes a pulse-width modulation controller.

Example 15: A power supply system, comprising: a secondary output voltage regulator that uses a closed-loop current feedback signal to produce an output voltage; an error adjustment signal that is based on a primary side input current and a target current limit; and, a current feedback combiner to, based on the error adjustment signal, change the closed-loop feedback signal to limit an output current.

Example 16: The power supply system of claim 15, wherein the secondary output voltage regulator includes a pulse-width modulation controller.

Example 17: The power supply system of claim 16, further comprising: a constant current reference.

Example 18: The power supply system of claim 17, further comprising: a constant current reference modulator to, based on the primary side input current and the target current limit, scale the constant current reference to produce the error adjustment signal.

Example 19: The power supply system of claim 18, wherein the target current limit is configurable by an external system.

Example 20: The power supply system of claim 18, further comprising: proportional-integral-derivative feedback to scale the constant current reference to produce the error adjustment signal.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

The invention claimed is:

1. A method, comprising:
   scaling a reference current based on a constant current adjustment, the constant current adjustment generated based on an input power and an input power limit;
   generating an output current adjustment based on the scaled reference current; and
   regulating an output voltage based on the output current adjustment.

2. The method of claim 1, further comprising generating the constant current adjustment via a PID controller.

3. The method of claim 2, further comprising:
   receiving, via the PID controller, an error signal based on the input power and the input power limit; and
   generating, via the PID controller, the constant current adjustment based on the error signal.

4. The method of claim 3, wherein generating the constant current adjustment based on the error signal comprises generating the constant current adjustment to indicate 100% current capacity of the output current in response to the input power being less than the input power limit.

5. The method of claim 4, wherein the constant current adjustment does not affect the output current in response to the indication of 100% current capacity.

6. The method of claim 4, wherein generating the constant current adjustment based on the error signal comprises generating the constant current adjustment to indicate less than 100% current capacity of the output current in response to the input power being greater than the input power limit.

7. The method of claim 6, wherein the constant current adjustment decreases the output current in response to the indication of less than 100% current capacity.

8. The method of claim 3, wherein the input power is a primary side input power.

9. The method of claim 1, wherein the reference current comprises a constant current reference.

10. A method of regulating a secondary side output current, comprising:
    scaling a reference current based on a current adjustment signal, the current adjustment signal generated based on a primary side input power and a target power limit;
    generating an error adjustment signal based on the scaled reference current; and
    regulating an output voltage based on the error adjustment signal to limit an output current of the output voltage.

11. The method of claim 10, further comprising generating the current adjustment signal based on the primary side input power and the target power limit.

12. The method of claim 11, further comprising:
    receiving, via a PID controller, an error signal based on the primary side input power and the target power limit; and
    generating, via the PID controller, the current adjustment signal based on the error signal.

13. The method of claim 12, wherein generating the error adjustment signal comprises:
    generating the current adjustment signal to indicate 100% current capacity of the output current in response to the primary side input power being less than the target power limit; and
    generating the current adjustment signal to indicate less than 100% current capacity of the output current in response to the primary side input power being greater than the target power limit.

14. The method of claim 12, wherein the reference current comprises a constant current reference.

15. A power supply system, comprising:
- an error modulator configured to generate an error adjustment signal based on a primary side input power and a target power limit;
- a constant current reference modulator configured to scale a reference current based on the error adjustment signal;
- a current feedback combiner configured to generate an output current adjustment based on the error adjustment signal and an output current feedback; and
- a secondary output voltage regulator configured to produce an output voltage based on the output current adjustment.

16. The power supply system of claim 15, further comprising a constant current reference generator configured to generate the reference current.

17. The power supply system of claim 15, wherein the secondary output voltage regulator comprises a pulse-width modulation controller.

18. The power supply system of claim 15, wherein the target power limit is configurable by an external system.

19. The power supply system of claim 15, wherein the error modulator comprises a PID controller configured to:
- receive an error signal based on the primary side input power and the target power limit;
- generate the error adjustment signal based on the error signal; and
- provide the error adjustment signal to the error modulator.

* * * * *